United States Patent Office 3,216,836
Patented Nov. 9, 1965

3,216,836
OPTICAL CROWN GLASS
Walter Jahn, Mainz-Mombach, Germany, assignor to Jenaer Glaswerk Schott & Gen, Mainz, Germany, a corporation of Germany
No Drawing. Filed Aug. 19, 1960, Ser. No. 50,564
Claims priority, application Germany, Aug. 29, 1959, J 16,910
2 Claims. (Cl. 106—47)

The present invention relates to improvements in optical crown glass and more particularly to a crown glass which has an extreme optical position with a relatively small dispersion at a refractive index of about 1.53 to 1.68. The glass according to the invention consists of boroorthophosphate (borophosphoric acid), the pyrophosphates of strontium or barium, and one or more metal oxides. All of these glass components by themselves do not constitute glass-forming substances, but they solidify with a crystalline structure. They will only form glass when the individual phosphates and oxides are melted together in suitable proportions by weight.

The pyrophosphates of barium or strontium serving as the phosphate components of such a glass may also be replaced by the corresponding meta- or orthophosphates. The glass resulting therefrom likewise shows good optical properties.

The glass according to the present invention consists of up to 78% by weight of boroorthophosphate and up to 48% by weight of alkali oxides, alkaline earth oxides, and oxides of aluminum, zinc, cadmium, lanthanum, arsenic, antimony, lead, and bismuth, used either individually or together.

According to a modification of the invention, the glass may also consist of 14 to 78% by weight of boroorthophosphate, 0 to 84% by weight of barium pyrophosphate and/or strontium pyrophosphate, and of 2 to 48% by weight of alkalioxides, alkaline earth oxides, and oxides of aluminum, zinc, cadmium, lanthanum, arsenic, antimony, lead, and bismuth, used either individually or together.

According to a further modification of the invention it is possible to replace the component in barium pyrophosphate and/or strontium pyrophosphate partly or entirely by barium phosphate and/or strontium phosphate in the form of meta- or ortho compounds thereof.

Although in principle it is possible to apply oxidic raw materials as individual components for producing optical glass, provided a sufficient excess of the easily sublimable or vaporizable components is added to the mixture, the selection of oxidic raw materials is, however connected with several very serious disadvantages as regards the optical quality and the possibility to reproduce th eoptical value, since serious optical inhomogeneities occur in the form of cords or striae and also considerable losses in substance always occur due to the inclination of the phosphorus pentoxide toward sublimation and vaporization.

For producing optical glass according to the invention, the raw materials are applied in an extremely pure condition and are intimately mixed with each other in the conventional manner, whereupon the mixture is placed into a crucible which is placed into a furance of a conventional type. The melting crucible preferably consists of platinum, although it may also be made of other suitable materials. For melting the optical glass with a phosphate base according to the invention, it is necessary to apply temperatures of 1200 to 1300° C. For homogenizing, it is necessary to stir the molten mass, and during the stirring it is advisable to allow the mass to cool to approximately 1200 to 1100° C. After the crucible has been removed from the melting furnace and after the glass has then reached the desired viscosity, it is poured into preheated molds which are then placed into the usual annealing ovens. The range of transformation of the glass lies between about 500 to 600° C.

The following tables show different examples of suitable compositions of the crown glass according to the present invention. The values given in the examples are understood to be in percent by weight.

TABLE 1

| No | 3968 | 3984 | 4013 | 4022 | 4032 | 4141 |
|---|---|---|---|---|---|---|
| $BPO_4$ | 29.40 | 21.37 | 20.46 | 19.88 | 18.84 | 14.86 |
| $Ba_2P_2O_7$ | 67.12 | 74.15 | 70.97 | 68.99 | 65.36 | 71.42 |
| ZnO | 3.48 | 4.48 | 8.57 | 11.13 | 15.80 | 13.72 |
| $n_d$ | 1.6024 | 1.6114 | 1.6184 | 1.6236 | 1.6291 | 1.6339 |
| $v$ | 66.04 | 64.54 | 63.55 | 62.55 | 61.19 | 60.65 |

TABLE 2

| No | 4177 | 4003 | 4176 | 4008 | 4020 | 4023 |
|---|---|---|---|---|---|---|
| $BPO_4$ | 72.41 | 29.16 | 39.39 | 33.26 | 27.71 | 20.60 |
| $Ba_2P_2O_7$ | | 66.57 | 50.10 | 60.44 | 63.26 | 71.46 |
| MgO | 27.59 | 4.27 | 10.51 | | | |
| CaO | | | | 6.30 | 9.03 | 7.94 |
| $n_d$ | 1.5314 | 1.6046 | 1.5793 | 1.6019 | 1.6098 | 1.6167 |
| $v$ | 76.97 | 66.07 | 67.55 | 66.53 | 65.67 | 64.42 |

TABLE 3

| No | 4153 | 4156 | 4154 | 4155 | 4075 | 4242 |
|---|---|---|---|---|---|---|
| $BPO_4$ | 54.93 | 56.17 | 50.13 | 45.48 | 32.52 | 45.64 |
| $Ba_2P_2O_7$ | 16.64 | | 16.35 | 16.07 | 39.03 | 6.79 |
| BaO | 28.43 | 43.83 | 33.52 | 38.45 | 28.45 | 47.57 |
| $n_d$ | 1.5840 | 1.5932 | 1.5936 | 1.6021 | 1.6130 | 1.6114 |
| $v$ | 68.56 | 67.40 | 67.24 | 66.38 | 65.17 | 64.95 |

TABLE 4

| No | 4158 | 4039 | 4066 | 4048 | 4068 | 3938 |
|---|---|---|---|---|---|---|
| $BPO_4$ | 59.51 | 33.82 | 35.83 | 29.61 | 17.06 | 21.46 |
| $Ba_2P_2O_7$ | | 61.45 | 42.99 | 53.82 | 79.06 | 74.43 |
| SrO | 40.49 | 4.73 | 21.18 | 16.57 | 3.88 | |
| PbO | | | | | | 4.11 |
| $n_d$ | 1.5826 | 1.5995 | 1.6033 | 1.6093 | 1.6129 | 1.6160 |
| $v$ | 68.29 | 67.25 | 66.80 | 65.46 | 64.68 | 61.64 |

TABLE 5

| No | 4228 | 4236 | 4229 | 3971 | 3975 | 3925 |
|---|---|---|---|---|---|---|
| $BPO_4$ | 18.29 | 16.07 | 35.48 | 29.14 | 21.53 | 29.61 |
| $Ba_2P_2O_7$ | 67.85 | 76.63 | 30.09 | 66.54 | 74.70 | 67.68 |
| CdO | 13.86 | 7.30 | 34.43 | | | |
| $Al_2O_3$ | | | | 4.32 | 3.77 | |
| $Na_2O$ | | | | | | 2.68 |
| $n_d$ | 1.6379 | 1.6274 | 1.6476 | 1.6003 | 1.6080 | 1.5916 |
| $v$ | 60.54 | 62.31 | 57.79 | 66.72 | 65.17 | 66.26 |

TABLE 6

| No | 4104 | 4100 | 4108 | 4111 | 4278 | 4285 |
|---|---|---|---|---|---|---|
| $BPO_4$ | 32.87 | 26.41 | 34.45 | 20.51 | 42.11 | 41.25 |
| $Ba_3(PO_4)_2$ | | | | | 40.98 | 40.36 |
| $Ba_2P_2O_7$ | 44.02 | 47.98 | 46.11 | 71.15 | | |
| ZnO | 2.22 | 17.41 | 4.64 | 2.86 | | |
| BaO | 20.89 | 8.20 | | | | 18.39 |
| SrO | | | 14.80 | 5.48 | 16.91 | |
| $n_d$ | 1.6146 | 1.6273 | 1.6077 | 1.6154 | 1.5951 | 1.5985 |
| $v$ | 64.49 | 61.42 | 66.27 | 64.80 | 67.06 | 66.51 |

TABLE 7

| No | DM3706 | DM3722 | DM3723 | 4279 | 4291 | 4288 |
|---|---|---|---|---|---|---|
| $BPO_4$ | 35 | 18 | 50 | 41.32 | 20.47 | 30.71 |
| $Ba_3(PO_4)_2$ | | 31 | 8 | 42.04 | 71.02 | 55.88 |
| $Sr(PO_3)_2$ | 35 | 36 | | | | |
| $Sr_3(PO_4)_2$ | | | 7 | | | |
| MgO | | | | | 8.51 | |
| CaO | | | | 16.64 | | |
| ZnO | | | | | | 13.49 |
| BaO | 30 | | | | | |
| CdO | | 15 | 35 | | | |
| $n_d$ | 1.6025 | 1.6274 | 1.6119 | 1.6045 | 1.5975 | 1.6150 |
| v | 65.67 | 61.49 | 60.04 | 65.44 | 65.88 | 62.55 |

TABLE 8

| No | 4316 | 4297 | 4275A | 4304 | 4317 | 4307 |
|---|---|---|---|---|---|---|
| $BPO_4$ | 33.00 | 20.98 | 42.11 | 26.43 | 27.72 | 18.97 |
| $Ba_3(PO_4)_2$ | 57.76 | | | | | |
| SrO | | | 16.91 | | | |
| $Ba(PO_3)_2$ | | | 40.98 | 59.00 | 38.66 | |
| CdO | 9.24 | | | | 33.62 | |
| $Ba_2P_2O_7$ | | 71.17 | | | | 64.33 |
| $As_2O_3$ | | 7.85 | | | | |
| $Sb_2O_3$ | | | | 14.57 | | |
| $Bi_2O_3$ | | | | | | 16.70 |
| $n_d$ | 1.6149 | 1.6144 | 1.5948 | 1.6224 | 1.6406 | 1.6766 |
| v | 64.68 | 63.16 | 67.64 | 53.03 | 58.67 | 46.49 |

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. Optical crown glass consisting essentially of 16 to 36% by weight of boro-orthophosphate, 30 to 77% by weight of barium pyrophosphate and 2 to 35% by weight of a member selected from the group consisting of cadmium oxide, aluminum oxide and sodium oxide.

2. Optical crown glass consisting essentially of the following ingredients in the indicated percentages by weight Percent by weight
$BPO_4$ _____ 35.48
$Ba_2P_2O_7$ _____ 30.09
CdO _____ 34.43

References Cited by the Examiner
UNITED STATES PATENTS

| 2,684,304 | 7/54 | Weissenberg et al. | 106—47.0 |
| 2,777,774 | 1/57 | Weissenberg et al. | 106—47.0 |
| 2,971,854 | 2/61 | Geffcken | 106—47.0 |
| 2,996,391 | 8/61 | Weissenberg et al. | 106—47 |
| 2,996,392 | 8/61 | Bromer et al. | 106—47.0 |

TOBIAS E. LEVOW, *Primary Examiner.*

JOSEPH REBOLD, JOHN R. SPECK, *Examiners.*